US 9,323,948 B2

(12) United States Patent
Gupta et al.

(10) Patent No.: US 9,323,948 B2
(45) Date of Patent: Apr. 26, 2016

(54) DE-IDENTIFICATION OF DATA

(75) Inventors: Ritesh K. Gupta, Hyderabad (IN);
Prathima Nagaraj, Hyderabad (IN);
Sriram K. Padmanabhan, San Jose, CA (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 392 days.

(21) Appl. No.: 12/967,666

(22) Filed: Dec. 14, 2010

(65) Prior Publication Data
US 2012/0151597 A1 Jun. 14, 2012

(51) Int. Cl.
G06F 21/62 (2013.01)
G06F 21/10 (2013.01)

(52) U.S. Cl.
CPC ................... *G06F 21/6254* (2013.01)

(58) Field of Classification Search
CPC . G06F 21/6209; G06F 21/60; G06F 21/6245; H04L 63/0227; H04L 43/028
USPC .................. 705/3, 34; 713/189; 726/1, 26
See application file for complete search history.

(56) References Cited

U.S. PATENT DOCUMENTS

| 7,519,591 | B2 | 4/2009 | Landi et al. |
| 7,761,594 | B1* | 7/2010 | Mowat ............... H04L 67/2814 709/223 |
| 8,001,607 | B2* | 8/2011 | Stull et al. .................. 726/26 |
| 8,176,563 | B2* | 5/2012 | Redlich et al. .............. 726/27 |
| 2007/0078871 | A1 | 4/2007 | Iverson et al. |
| 2008/0077604 | A1 | 3/2008 | Bharara |
| 2008/0275829 | A1 | 11/2008 | Stull et al. |
| 2009/0070291 | A1* | 3/2009 | Tadayon ........... G06F 17/30067 |
| 2009/0132419 | A1 | 5/2009 | Grammer et al. |
| 2009/0132575 | A1 | 5/2009 | Kroeschel et al. |
| 2009/0163174 | A1 | 6/2009 | Baik et al. |
| 2009/0319588 | A1 | 12/2009 | Gandhi et al. |
| 2010/0042583 | A1* | 2/2010 | Gervais .................. G06Q 40/08 707/757 |
| 2010/0095378 | A1 | 4/2010 | Oliver et al. |
| 2010/0205189 | A1 | 8/2010 | Ebrahimi et al. |
| 2010/0250497 | A1* | 9/2010 | Redlich .................. F41H 13/00 707/661 |
| 2012/0131481 | A1 | 5/2012 | Gupta et al. |
| 2012/0266254 | A1 | 10/2012 | Gupta et al. |
| 2012/0266255 | A1 | 10/2012 | Gupta et al. |

FOREIGN PATENT DOCUMENTS

EP 1637954 A1 3/2006

OTHER PUBLICATIONS

Ahimanikya Satapathy, "Building an ETL Tool", SOA/Business Integration Sun Microsystems; pp. 1-26.
Dale Edgar, "Data Sanitization Techniques", A Net 2000 Ltd. White Paper.
White Paper, "Dynamic Data Masking Introduction", Overview and Implementation Best Practice; Introduction to Dynamic Data Masking; copyright 2010 ActiveBase Ltd. pp. 1-7.

(Continued)

*Primary Examiner* — Tae Kim
*Assistant Examiner* — Shiuh-Huei Ku
(74) *Attorney, Agent, or Firm* — Susan Murray; Edell, Shapiro & Finnan, LLC

(57) ABSTRACT

The present invention relates to a method, computer program product and system for de-identifying data, wherein a de-identification protocol is selectively mapped to a business rule at runtime via an ETL tool.

17 Claims, 6 Drawing Sheets

(56) References Cited

OTHER PUBLICATIONS

IRI, Inc., "Field Encryption, De-ID and Data Masking", www.cosort.com/products/FieldShield; copyright 2010 Innovative Routines International (IRI), Inc.

Co-Pending U.S. Appl. No. 12/951,453, filed Nov. 22, 2010.

International Search Report and Written Opinion, PCT/EP2011/072197, Feb. 13, 2012, 8 pages.

Dataguise Security Solutions for Sensitive Data, "Custom Solutions for Oracle E-Business Suite", Safely leverage production Oracle E-Business Suite data in test and development environments by masking sensitive data with dataguise dgmasker; Fremont, CA; www.dataguise.com.

Ulf Mattson, CTO, Protegrity, "Article: Developing, Deploying and Managing a Risk-Adjusted Data Security Plan", Apr. 2010 Newsletter; http://isaca-washdc.sharepointsite.net/resources/Articles/article-apr2010-print.htm; Copyright 2010—National Capital Area Chapter; pp. 1-4.

Ishna Neamatullah et al., "Automated de-identification of free-text medical records", BMC Medical Informatics and Decision Making 2008, 8:32.

ContactCenterWorld; The Global Association for Contact Center Best Practices & Networking; "Dataguise Expands Sensitive Data Discovery and Masking Solution," ContactCenterWorld.com 1999-2010.

Kinetic Networks Innovative Information Management; Company Case Studies; http://kineticnetworks.com/company/cases.html; Kinetic Networks ~ Company—Success Stories; Copyright 2010 Kinetic Networks, Inc.

J. Peter Bruzzese, "Reasons to Protect Corporate Data", The Perils of Unprotected Production Data; Published Apr. 26, 2010; Feature—Techworld.com.

John Billman, "The Need for Secure and Compliant Test Data Environments," Wednesday, Dec. 5, 2007; Copyright 2010 Computer Technology Review- Data Storage, Networking and Data Center Solutions.

* cited by examiner

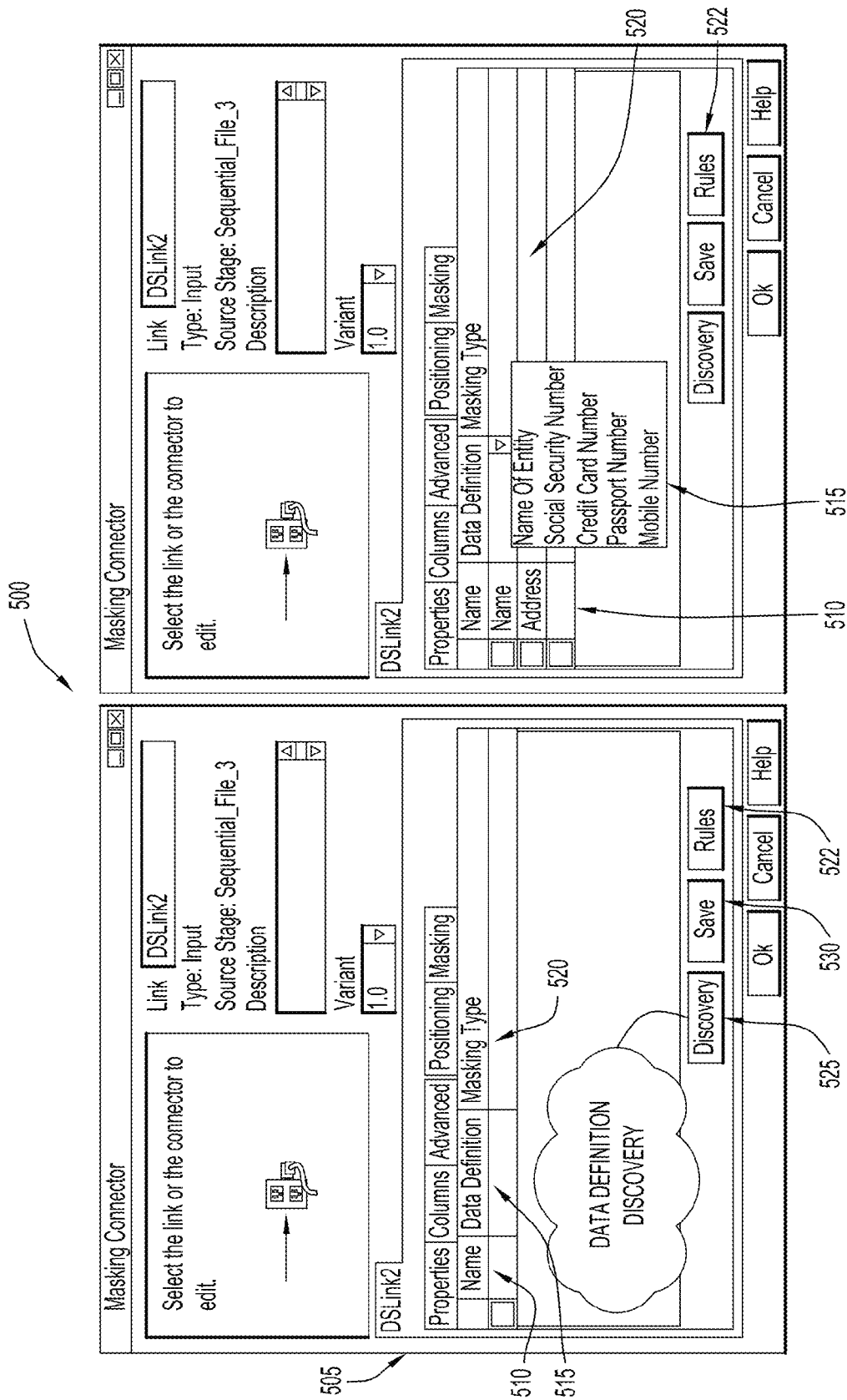

DE-IDENTIFICATION OF DATA

BACKGROUND

1. Technical Field

The present invention relates to a method and system for de-identifying data and, more particularly, to a computer-implemented method wherein a de-identification protocol is selectively mapped to a business rule at runtime via an ETL tool.

2. Discussion of the Related Art

Across various industries, data (e.g., data related to customers, patients, or suppliers) is shared outside secure corporate boundaries. Various initiatives (e.g., outsourcing tasks, performing tasks off-shore, etc.) have created opportunities for this data to become exposed to unauthorized parties, thereby placing data confidentiality and network security at risk. In many cases, these unauthorized parties do not need the true data value to conduct their job functions. Examples of data requiring de-identification include, but are not limited to, names, addresses, network identifiers, social security numbers and financial data.

Conventional data de-identification techniques are developed manually and implemented independently in an ad hoc and subjective manner for each application. Since it is not possible to consume sensitive fields and information into batch/real time processes, these processes, such as Extract/Transform/Load (ETL), are stand-alone processes in which live data is sourced in batch or real-time. Thus, data requiring de-identification located within a data source is initially discovered and profiled by a discovery tool. The discovery tool output is manually reviewed by a developer, who then defines the data de-identification parameters to apply to the discovered data based on the developer's understanding of the business rules. Specifically, an ETL developer manually identifies various field types, and then maps a single, default de-identification technique to apply to a field type, enabling the ETL process to de-identify those field types. The resulting de-identified data is subsequently delivered to the target environment. As a result, the default de-identification technique is effectively built into the ETL tool at design time. Should a change in the business rule occur, or if different targets have different de-identification requirements, the built-in technique may not be effective to sufficiently de-identify the data.

BRIEF SUMMARY

According to an embodiment of the present invention, a computer-implemented method dynamically de-identifies data from a data source for a target application. A data discovery/analyzer tool identifies and profiles data elements within a data source, generating data definition types for data elements, including indicating data elements requiring de-identification. An interface enables a user to define business rules including de-identification protocols for specific data definitions received from the discovery/analyzer tool and to selectively map the business rule to the data definition, thereby mapping a de-identification protocol to a data element requiring de-identification. The specified de-identification protocols are applied to the sensitive data elements at run time to de-identify the sensitive data elements for the target application. Embodiments of the present invention further include a system and computer program product for selectively mapping a de-identification protocol to sensitive data elements in substantially the same manner described above.

BRIEF DESCRIPTION OF THE SEVERAL VIEWS OF THE DRAWINGS

FIGS. 5A-5C illustrate a graphical user interface through which a user can define parameters of a data de-identification or masking process for an ETL or other job.

DETAILED DESCRIPTION

Figure 1:
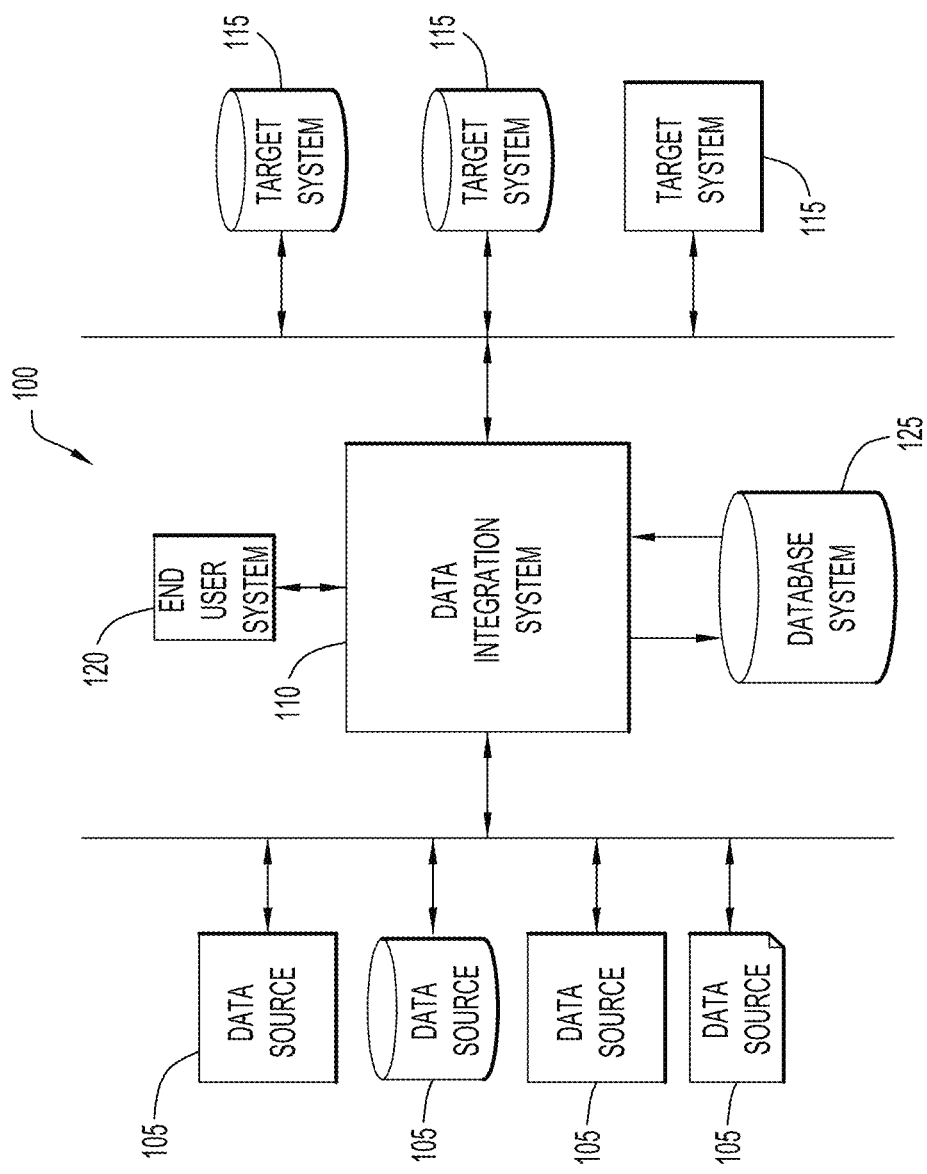
FIG. 1 is a diagrammatic illustration of a platform employed by a data integration system according to an embodiment of the present invention.

FIG. 1 represents a system or platform 100 for facilitating integration of various data of a business enterprise. The platform 100 includes a plurality of computer-implemented business processes, each of which may include a plurality of different computer applications and data sources. In this embodiment, the platform includes several data sources 105. These data sources 105 may include a wide variety of data sources (e.g., computer systems, database systems, applications, files, etc.) from a wide variety of physical locations. For example, the data source 105 may include database systems such as IBM® DB2® (IBM and DB2 are trademarks of International Business Machines Corporation, registered in many jurisdictions worldwide), as well as database systems or other application programs from many other sources, such as Oracle, Sybase, Microsoft, EMC, and additionally, complex flat files, FTP files, or other systems or sources that provide data to the business enterprise. The data sources 105 may reside at various locations or they may be centrally located.

The platform 100 also includes a data integration system 110. The data integration system 110 is preferably in the form of a computer system, and may perform a number of functions, such as an ETL process to extract data from data sources 105 and provide the extracted data to target systems 115. The data integration system 110 may send commands to one or more of the data sources 105 such that the data source provides data to the data integration system 110. Since the data received may be in multiple formats with varying metadata, the data integration system 110 may reconfigure the received data such that it can be later combined for integrated processing.

The platform 100 also includes several target systems 115 and one or more end-user systems 120. The target systems 115 are preferably in the form of computer systems, and may include databases (such as a data warehouse) or processing platforms used to further manipulate the de-identified data communicated from the data integration system 110 (such as an operational data store). The end-user systems 120 may present a graphical user or other interface (e.g., command line prompts, menu screens, etc.) to solicit information from users that pertain to the desired tasks to be performed (e.g., de-identification or masking) and to associate information (e.g., resource requirements, parameters, etc.). The end-user systems 120 communicate information to the data integration system 110 so that the data integration system may utilize the information to cleanse, combine, transform or otherwise manipulate the data it receives from the data sources 105 and provide de-identified data to target systems 115. As a result, another system can use the processed data to produce reports useful to the business. The reports may be used to report data associations, answer complex queries, answer simple queries, or form other reports useful to the business or user.

The platform 100 may also include a database or database management system 125. The database system 125 may be used to store metadata or other information for the data integration system. For example, the data integration system 110 may collect data from one or more data sources 105 and transform the data into forms that are compatible with one or more target systems 115 in accordance with the information in database system 125. Once the data is transformed, the data integration system 110 may store the data in the database system 125 for later retrieval. By way of example, the database system 125 may be in the form of a database server.

The data sources 105, end-user systems 120, target systems 115, and database system 125 may be implemented by any conventional or other computer systems preferably equipped with a display or monitor, a base (e.g., including the processor, memories and/or internal or external communications devices (e.g., modem, network cards, etc.)), optional input devices (e.g., a keyboard, mouse or other input device), and any commercially available and/or custom software (e.g., server/communications software, database access software, etc.).

The platform components 105, 110, 120, 115, 125 may communicate over a network. The network may be implemented by any number of any suitable communications media (e.g., wide area network (WAN), local area network (LAN), Internet, Intranet, etc.). Alternatively, the components 105, 110, 120, 115, 125 may be local to each other and/or and communicate via any appropriate local communication medium (e.g., local area network (LAN), hardwire, wireless link, Intranet, etc.).

Figure 2:
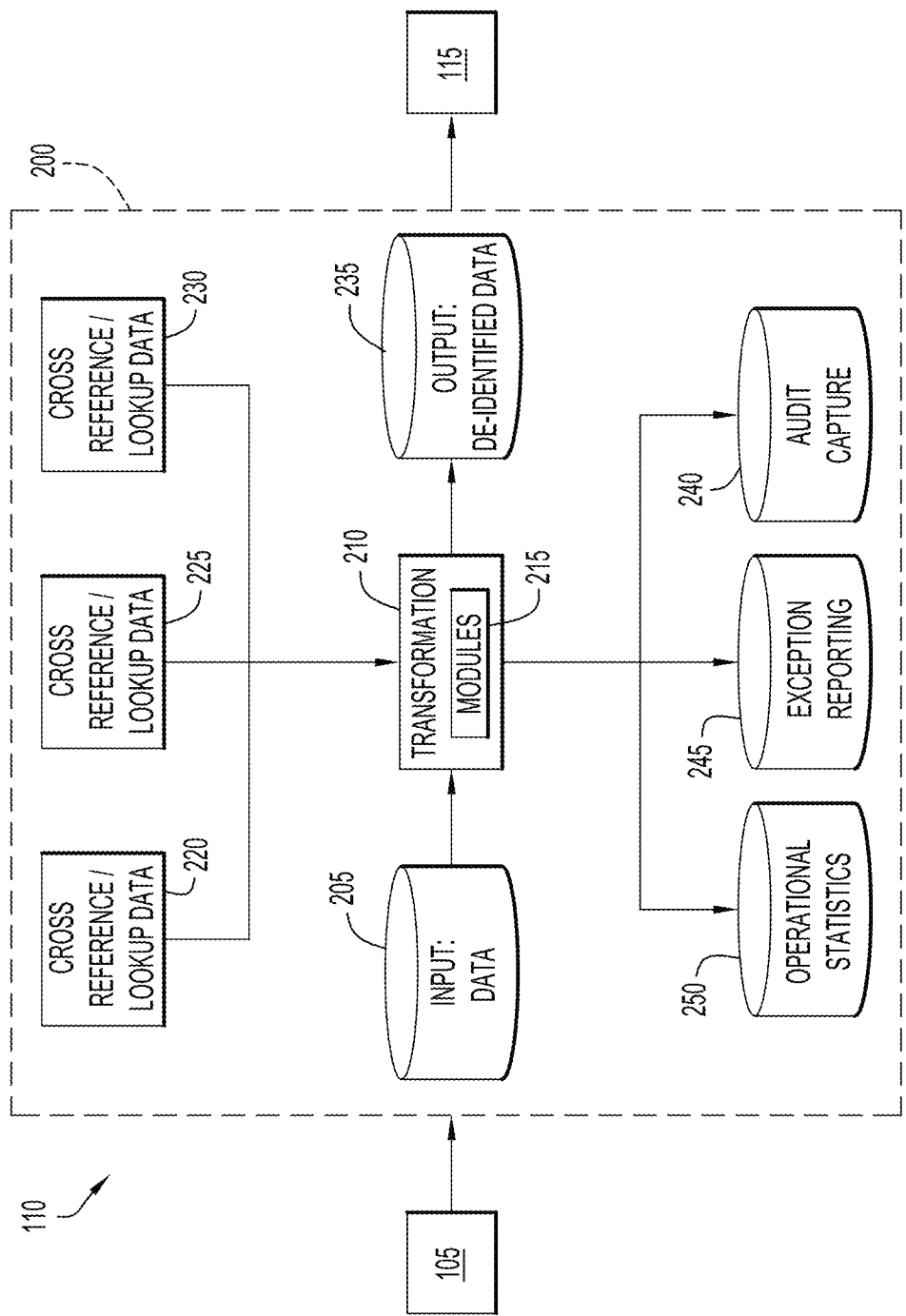
FIG. 2 is a diagrammatic illustration of an example data de-identification system according to an embodiment of the present invention.

FIG. 2 illustrates a data de-identification system 200 contained within the data integration system 110. The data de-identification system 200 may be implemented by any combination of software and/or hardware modules or units. Data 205 from data sources 105 include sensitive data (e.g., data including sensitive data elements that need to be de-identified to preserve the confidentiality of the data). The data 205 is received by the transformation facility or tool 210 having various modules 215 such as a data de-identification tool. The data integration system 110 preferably performs an ETL or other process, where the transformation facility 210 collects data 205 from data sources 105, and performs data discovery on data 205 to generate data definitions and identify sensitive data. One or more of the modules 215 selectively utilize cross-reference and/or lookup data 220, 225, 230 to identify the sensitive data. The cross-reference data 220, 225, 230 may further include information for data mapping, validation, and de-identification. The transformation facility 210 further de-identifies the sensitive data for the ETL or other process to generate output of de-identified data 235 for target systems 115 (discussed in greater detail below).

The transformation facility 210 may also generate an audit capture report stored in an audit capture repository 240, an exception report stored in an exception reporting repository 245 and an operational statistics report stored in an operational statistics repository 250. The audit capture report serves as an audit to record the action taken on the data. The exception report includes exceptions generated by the transformation facility 210. The operational statistics report includes operational statistics that capture file information, record counts, etc.

By way of example, the transformation facility 210 may include IBM® InfoSphere™ or IBM® DataStage® business applications (IBM, InfoSphere and DataStage are trademarks of International Business Machines Corporation, registered in many jurisdictions worldwide).

Figure 3:
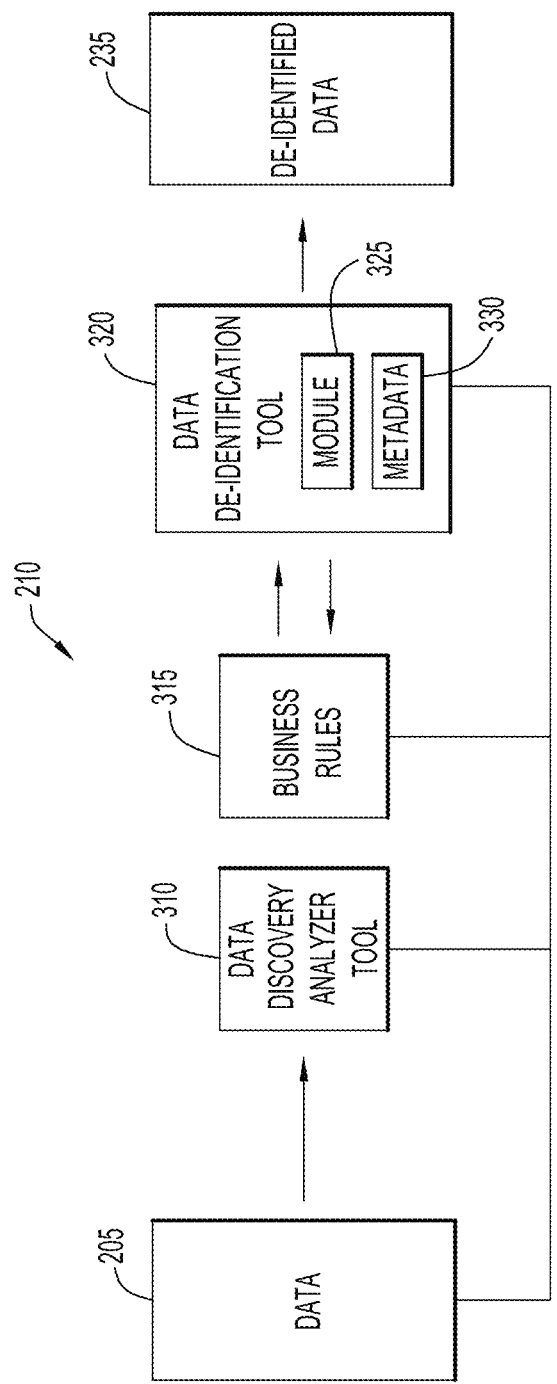
FIG. 3 is a diagrammatic illustration of a transformation tool within the data de-identification system in accordance with an embodiment of the invention.

FIG. 3 is a block diagram of the transformation facility 210 operable to de-identify or mask sensitive data (e.g., for an ETL or other process) while preserving data usability. In one embodiment, the facility 210 includes a data discovery/analyzer tool 310, a business/information technology rule library 315, and a data de-identification tool 320. The data discovery/analyzer tool 310 queries a data source 105 to extract and profile data. The data source 105 provides the data to the discovery/analyzer tool 310, which, in turn, facilitates communication of the extracted data to the other portions of the transformation facility 210 (e.g., the de-identification tool 320).

The discovery/analyzer tool 310 may extract data from a plurality of data sources 105, providing data to the transformation facility 210 that is to be normalized, cleansed, de-identified, and/or consolidated (e.g., into a central database or repository information manager). The discovery/analyzer tool 310 analyzes the data by examining attributes, profiles, and relations to identify data fields within the extracted data and the particular fields containing sensitive data (thereby identifying sensitive data elements). The discovery/analyzer tool 310 generates data definitions for each field or element identified in the data. The data definitions indicate various properties of a corresponding data field. By way of example, the data definition generated by the discovery/analyzer tool 310 for a data field may be in the form of an XML file including various parameters (e.g., the table containing the data field, the attribute or column of the table containing the data field, the type of field, an indication identifying the field as a sensitive data field, etc.).

The data discovery/analyzer tool 310 further performs data profiling that prepares, standardizes, matches, or otherwise manipulates the data to produce quality data to be later transformed. The discovery/analyzer tool 310 analyzes the data 205 extracted from the data sources 105 to identify and document sensitive data elements within the data 205 from the data sources 105 (e.g., where the data is located and how it is linked across systems) by intelligently capturing relationships between the data elements. The data discovery/analyzer tool 310 further creates mapping specifications that indicate the applicable transformations to be applied to sensitive data elements based on the business rules (i.e., the discovery/analyzer tool identifies one or more business rules that are applied against the data elements).

By way of example, the data discovery/analyzer tool 310 may be a tool such as IBM® InfoSphere™ Discovery and/or a data analyzer software tool such as IBM® InfoSphere™ Information Analyzer, both of which are available from International Business Machines Corporation. These tools may be used individually or in concert.

The business rule library 315 contains one or more rules that are applied against the value of an analyzed data element. The business rules define the appropriate de-identification protocol applied to a sensitive data element by the de-identification tool 320. The business rules may include default or design time business rules (e.g., developer-defined business rules developed at design time) and/or runtime or user-created business rules (e.g., business rules created by the user at runtime). The business rules 315 are present within a library of business rules stored, e.g., within the cross-reference data 220, 225, 230.

The data de-identification tool 320 applies the de-identification protocol to sensitive data elements identified by the discovery/analyzer tool 310. The data de-identification tool 320 utilizes de-identification modules 325 and metadata 330 to transform sensitive data elements into de-identified or masked data elements such that the data elements are desensitized (e.g., to transform the sensitive data such that the data has a security risk that does not exceed a predetermined risk level). Specifically, the data de-identification tool 320 receives the data 205 and the generated data definitions, and applies the de-identification protocol to the sensitive data fields/elements to produce de-identified data 235.

As noted above, the de-identification protocol applied by the data de-identification tool 320 is obtained from the business rules 315 mapped to the data definitions, which specify the de-identification protocol to be applied to the sensitive data. For example, a business or IT rule may require data to be de-identified through encryption, digit swapping, rounding, truncation, scrambling, etc. Thus, the de-identification protocol is determined from business rules 315 mapped to the data definitions (including sensitive data types), which, in turn, were generated by the discovery/analyzer tool 310. The user maps the business rule (and thus the de-identification protocol) to the data definition (and thus the data element) utilizing a graphical user interface (discussed in greater detail below).

By way of example, the data de-identification tool 320 may be implemented by IBM DataStage products, including the IBM® Optim™ Data Privacy Solution (IBM DataStage and Optim are trademarks of International Business Machines Corporation, registered in many jurisdictions worldwide).

Figure 4:
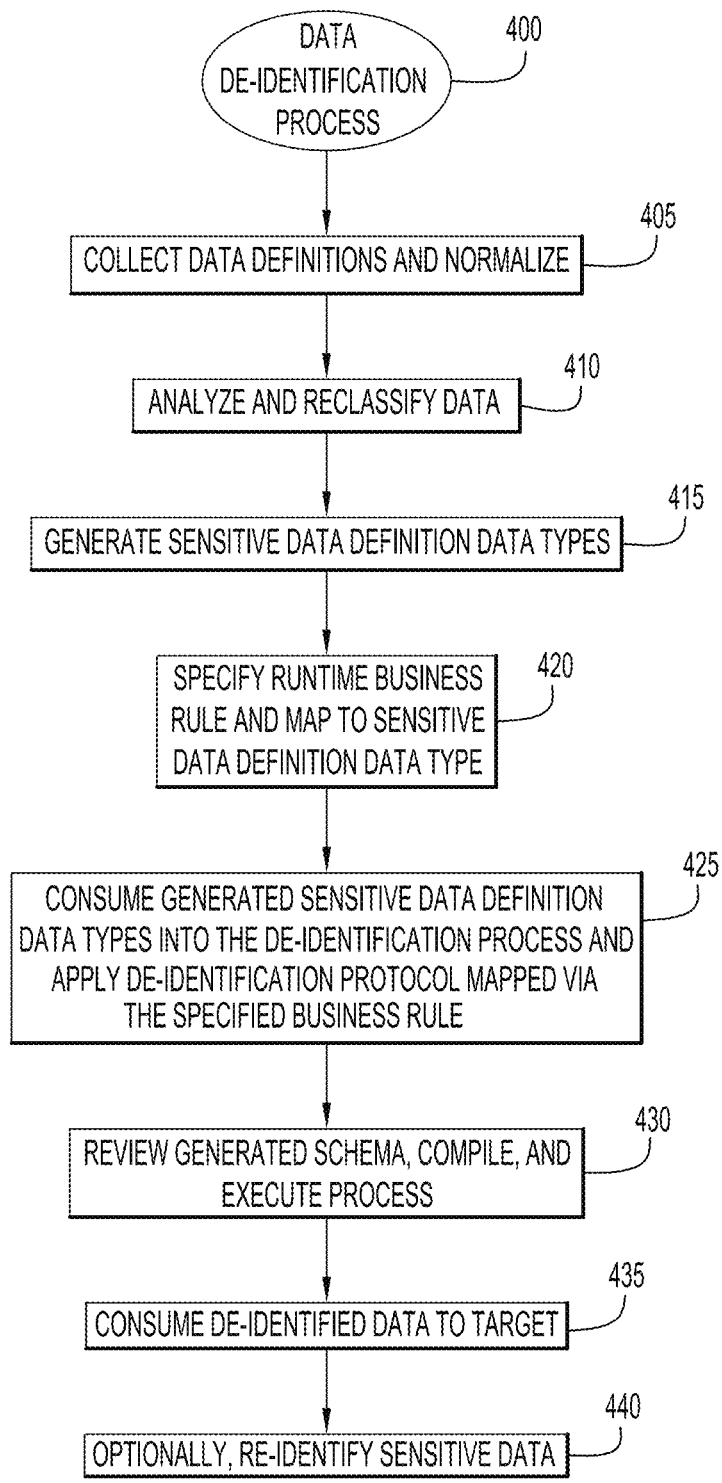
FIG. 4 is a procedural flow chart illustrating the manner in which the data is de-identified or masked according to an embodiment of the present invention.

FIG. 4 depicts a flow diagram of a data de-identification process 400 in accordance with an embodiment of the present invention. Initially, the data definitions for all data fields are collected and normalized at Step 405. Specifically, the discovery/analyzer tool 310 receives a command to extract (collect) data elements from one or more data sources 105. Following the receipt of an extraction command, the data discovery/analyzer tool 310 may identify the appropriate data sources 105 where the data to be extracted resides. The data source 105 may or may not be identified in the command. If the data source 105 is identified, the discovery/analyzer tool 310 may query the identified data source 105. In the event that a data source 105 is not identified in the command, the discovery/analyzer tool 310 may determine the data source from the type of data requested from the data extraction command, from another piece of information in the command, or after determining the association to other data that is required. For example, the query may be for a customer address. The first portion of the customer address data may reside in a first database, while a second portion resides in a second database. The discovery/analyzer tool 310 may process the extraction command and direct its extraction activities to the two databases without further instructions in the command.

The discovery/analyzer tool 310 further normalizes the data so that like data elements are treated consistently in the data de-identification process, thereby reducing the set of data elements created from varying data names and mixed attributes. A non-normalized data name may be mapped to a corresponding normalized data name that is included in a set of pre-defined normalized data names. The normalization process is repeated so that the non-normalized data names are mapped to the normalized data names in a many-to-one correspondence. For example, one or more non-normalized data names may be mapped to a single normalized data name in the normalization process. Non-normalized data names (e.g., CUSTOMER-NAME, CORPORATION-NAME and CONTACT-NAME) may be mapped to a single normalized data name (e.g., NAME), thereby indicating that CUSTOMER-NAME, CORPORATION-NAME and CONTACT-NAME should be de-identified or masked in a similar manner. Further analysis into the data properties and sample data values of CUSTOMER-NAME, CORPORATION-NAME and CONTACT-NAME may be utilized to verify the normalization.

Once extracted, in Step 410, the data is analyzed via the discovery/analyzer tool 310. As noted above, the discovery/analyzer tool 310 analyzes data values and data patterns to identify overt relationships, as well as hidden relationships that link disparate data elements into logical groupings of related data or business objects. The tool 310 generates data definitions for the extracted data, as well as creates mapping specifications to transform extracted data into a consumable format for a target application based on business requirements as described above. Specifically, at Step 415, discovery/analyzer tool 310 identifies sensitive data definition types within the extracted data. By way of example, the discovery/analyzer tool 310 may locate sensitive data elements contained within larger fields or separated across multiple columns.

At Step 420, the business rules 315 are mapped to the data definitions. Initially, a default business rule selected from the library of business rules to a sensitive data definition type. The user, moreover, may selectively map a business rule to the sensitive data definition type at runtime. For example, user may select another business rule from the library of business rules to apply to a corresponding sensitive data definition type. That is, the business rule mapped to the sensitive data definition type may be changed from the default rule to another rule from the library of business rules. This runtime business rule may be selected to apply a desired de-identification protocol to the sensitive data definition type other than that selected by the default business rule. The runtime business rule may be entered via the graphic user interface, e.g., by indicating the file name where the runtime rule is stored.

In addition, the graphic user interface may be utilized to enter a user-defined business rule 315. By way of example, the interface may include a text box or other form associated with a corresponding sensitive data definition type. The user enters the parameters of the business rule into the text box, including the desired de-identification protocol. The generated business rule is linked to the sensitive data definition type, applying the de-identification protocol specified by the rule. The new, user-generated business rule is saved to the business rule library.

At Step 425, the data definitions (including the sensitive data definition types) are consumed into the de-identification process. The de-identification protocol (e.g., encryption, truncation, etc.) is selectively applied to a data element or to a group of data elements based on the type of sensitive data contained in the data definition (e.g., credit card number, social security number, etc.), as well as the business rules 315 that define the de-identification protocol for that particular type of sensitive data. Specifically, the business rules 315 are applied to the sensitive data elements discovered by the discovery/analyzer tool 310 to determine whether the data elements are subject to the de-identification protocol. For example, a business rule may require certain data to be de-identified based on a certain de-identification protocol. The particular de-identification protocol applied is based on the business rule that is mapped to the data definition, which is supplied by user via a graphical user interface as described below. Even if a default protocol is generated within the system, the business rules may be selectively altered to change the applied protocol at run time via changes made by the user on the graphical user interface.

With the above-described configuration, the discovery/analyzer 310 tool enables identification of confidential data across environments by examining values across multiple sources to determine complex rules and transformations that may hide sensitive content, and then form data definitions utilized by the de-identification tool 320 to apply the de-identification protocol required by the business rules 315. In addition, any new data consumed by the discovery/analyzer tool 310 (e.g., any data consumed by the discovery/analyzer tool 310 after the completion of the initial de-identification process) would be automatically de-identified in accordance with the data definition and business rules applied to the previously de-identified data.

A user may initiate the above-described process from an end-user system 120 utilizing an interface application of the transformation system 210. In addition, a user may selectively alter the mapping of a business rule to a data definition, as well as enter a new runtime business rule through the use of the interface application. In particular, the transformation system 210 may include an interface application or module that presents a graphical user interface (GUI) to the user via an end-user system 120 that enables the selection of a de-identification protocol. Any number or type of user interfaces (e.g., Graphical User Interface (GUI), command-line, prompt, etc.) may be utilized, where the interface may include any information arranged in any fashion. The interface may include any number of any types of input or actuation mechanisms (e.g., buttons, icons, fields, boxes, links, etc.) disposed at any locations to enter/display information and initiate desired actions via any suitable input devices (e.g., mouse, keyboard, etc.). The interface screens may include any suitable actuators (e.g., links, tabs, etc.) to navigate between the screens in any fashion.

Figure 5C:
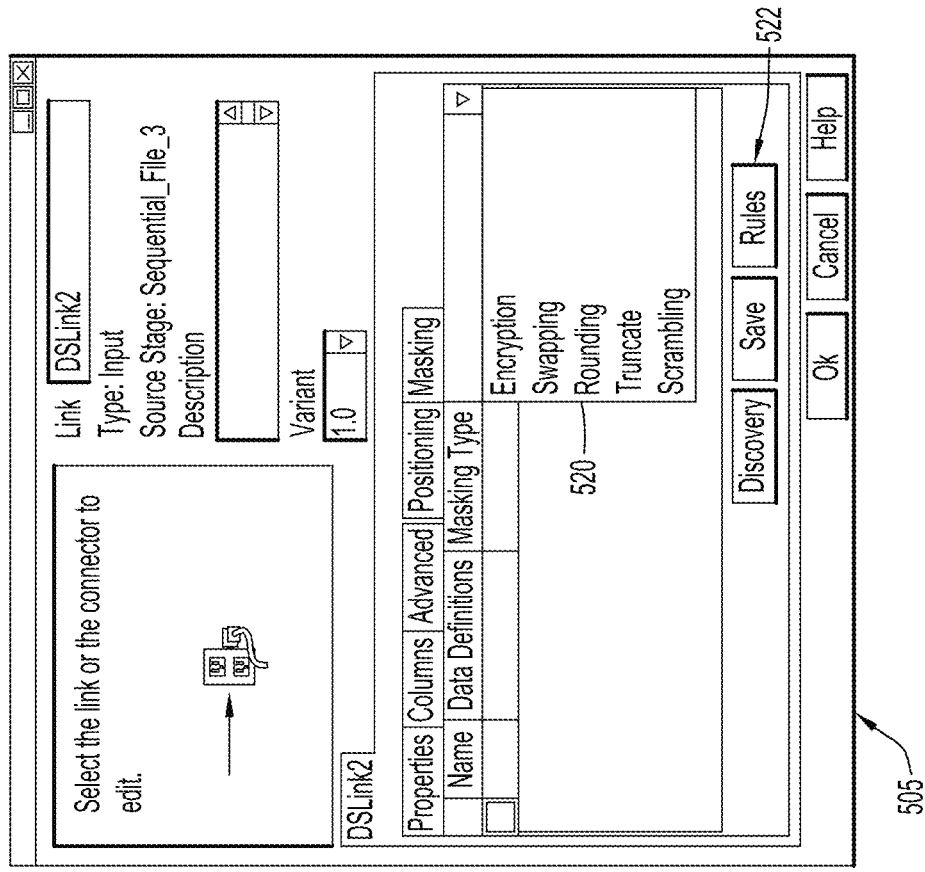

FIGS. 5A, 5B, and 5C show a graphical user interface 500 in accordance with an embodiment of the present invention through which an end user can enter runtime business rules and/or map a business rule to a corresponding data definition generated by the discovery/analyzer tool 310 (e.g., to map the business rules to the data definitions to define the parameters of the data de-identification process). Thus, in the example depicted in FIG. 5A, the graphical interface 500 includes a series of parameters 510, 515, 520 for a particular link where the data de-identification process 505 can access any suitable data source 105 and deliver data to any suitable target system 115, as described above. The graphical interface 500 may present data relating to a connector/operator or a link within a flow. For example, parameter 510 provides a name field ("Name"), while parameters 515, 520 each provides a drop down menu for a sensitive data type ("Data Definition") and de-identification protocol ("Masking Type"), respectively.

The parameters for the connector/operator or link may be populated by information obtained by the discovery/analyzer tool 310 upon activation of discovery button 525. The discovery button 525 may enable importation of the data definitions from discovery/analyzer tool 310 when the discovery/analyzer tool has been previously executed for a desired data set. Alternatively, the discovery button 525 may initiate the discovery/analyzer tool 310 to extract data from the data sources 105, identify data fields, and generate the data definitions. The data definitions are utilized to populate the fields as described above. This may be utilized in order to generate data definitions for any new or modified data.

The interface may determine initial values for the parameters 510, 515, 520 based on the data definitions and the default business rules 315 as described above. For example, the data field parameter 510 may be populated with the single, normalized data name mapped to (a non-normalized) sensitive data type discovered by the discovery/analyzer tool 310, as described above. The data definition parameter 515 may then be populated with the data definition type associated with the data contained in the data field parameter (based on the data definition) and generated by the discovery tool 310. In addition, an initial, default de-identification protocol may be populated into the parameter 520 based on the data definition and business rules 315.

Once populated, the user may selectively modify the sensitive data type designation (parameter 515) and the de-identification protocol (parameter 520) of the corresponding sensitive data element (parameter 510). By way of example, parameter 515 provides a drop down menu with various data types (e.g., Name of Entity, Social Security Number, Credit Card Number, Passport Number, Mobile Number, etc.) that may be utilized to modify the sensitive data type corresponding to the associated data field (parameter 510). By way of further example, parameter 520 provides a drop down menu with various de-identification protocols (e.g., Encryption, Swapping, Rounding, Truncate, Scrambling, etc.) from which the user may select the de-identification protocol to associate with the sensitive data type (parameter 515). However, the present invention embodiment may provide any other suitable parameters, and employ any conventional or other data types and de-identification protocols.

Alternatively, a user may enter a name and the interface application may retrieve parameter values for the entered name from the data definitions. If the name does not correspond to identified sensitive data, the user may further enter information for the parameters to, in effect, render the field sensitive, where some of the information may be retrieved from the corresponding data definition.

In addition, a user may activate a Rules button 522 to enter a file name designating the storage location of a runtime business rule. The interface application 500 may retrieve the business rules, populating parameter values for the data definitions 515 and masking protocol 520 mapped thereto. Alternatively, a user may activate the Rules button 522 to display a text box that enables a user to create a user-defined business rule including a desired de-identification protocol, which is mapped to the data definitions generated by the discovery tool 310. Any entered parameters may be saved upon activation of save button 530.

In this manner, information may be entered by a user and/or may be automatically populated from the data definitions. For example, the user may identify a data field 510 ("name," "cc no."), select the corresponding data type 515 contained within the discovery and analysis tools ("Name of Entity," Credit Card Number"), and then specify the desired level of de-identification or masking to apply to those the data elements forming the data field 510. By way of example, an "encryption" de-identification protocol may be applied to credit card information, and a "data swap" de-identification protocol may be applied to a customer address. With this configuration, the different de-identification protocols (e.g., encryption, swapping, rounding, truncate, scrambling, relational group swap, incremental autogen, string replacement, universal random, etc.) may be selectively mapped utilizing the interface application. Once the user selects the parameters, the business rules 315 are updated by the interface application to reflect the altered parameters. In this manner, data provided to the data integration system will automatically be de-identified according to the changes.

In addition, the graphical user interface may permit a user to enable or disable maintenance of the affinity for the de-identification. Specifically, affinity is maintained when the results of an operation for the de-identified data are similar to results of the operation for unmasked data. For example, with respect to a sort operation, the de-identification protocol ensures that the resulting de-identified data produces the same results or order from the sort operation as the unmasked data (even though the values for the de-identified data are different). By way of example, three unmasked data elements with values of 1, 2, 3 may be de-identified to contain values of 25, 50, 75 in order to provide the same resulting order from a sort operation and maintain affinity. When affinity is to be maintained, the corresponding de-identification protocols that are capable of maintaining the affinity for one or more operations are presented for selection by a user (thereby disabling the de-identification protocols that cannot maintain affinity). The desired operations for affinity maintenance may be further specified by a user.

Once the de-identification protocol is selected, the appropriate de-identification modules 325 are accessed for the ETL or other job. At Step 430 (FIG. 4), the generated schema is reviewed, the data and modules (e.g., de-identification modules) are compiled for the ETL or other job. Specifically, both the output generated by the default business rules and the output generated by the runtime business rules may be displayed via interface application to indicate the nature of the de-identified data under each schema.

The de-identification tool 320 involves the de-identification modules 325 through batch or real time transactions and supports any of a plurality of database types on a variety of platforms (e.g., mainframe and/or midrange platforms). The de-identification tool 320 reuses the data de-identification modules 325 that support the business rules 315, and that align with the normalized data fields so there is assurance that the same data is transformed consistently irrespective of the physical file in which the data resides, and irrespective of the technical platform of which the data is a part. Still further, the de-identification tool 320 keeps a repository of reusable components from data definitions and reusable de-identification modules that facilitate repeatable and consistent software development.

At Step 435, the de-identified data is delivered as output 235 to be consumed into the business application of the target system 115. Once de-identified, the data can be re-identified or unmasked at Step 440 based on the business rules 315 and sensitive data definitions, provided the user has clearance to initiate the unmasking process.

New data entering the integration system 110 may be automatically processed in a similar manner. In other words, new data entering the system is automatically de-identified or masked in accordance with the de-identification protocol selected via the interface application and/or the corresponding business rules.

Thus, the above-described invention provides a method that is capable discovering the data, analyzing the data for sensitivity, determining business rules and/or information technology (IT) rules that are applied to the sensitive data, allowing mapping of a selected de-identification method (based on the business and/or IT rules), and executing the selected de-identification method to replace the sensitive data with fictional data for storage or presentation purposes. The execution of the de-identification may generate desensitized (i.e., non-sensitive) data that allows the business application to remain fully functional.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises", "comprising", "includes", "including" and the like, when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

What is claimed is:

1. A computer program product for dynamically de-identifying sensitive data from a data source for a target application, the computer program product comprising a computer readable storage device having computer readable program code embodied therewith, the computer readable program code being configured to cause a hardware processor to:

generate a default rule set including at least one rule, the default rule set including a default de-identification protocol to produce de-identified data from an Extract/Transform/Load (ETL) tool, wherein the default de-identification protocol is selected based on business rules;

map the default rule set to data definitions each generated by a discovery tool and associated with a corresponding sensitive data element identified in the data;

specify a runtime rule set comprising at least one runtime rule, the runtime rule including a runtime de-identification protocol to produce de-identified data from the ETL tool, wherein the runtime rule set is specified via an interface;

replace the default rule set with the runtime rule set to change the default de-identification protocol to the runtime de-identification protocol at runtime to accommodate changing de-identification requirements of a target environment, and map the runtime rule set to the data definitions, wherein each data definition includes a data object comprising metadata, including an indicator of a type of sensitive data from among a plurality of types of sensitive data and information indicating the location of the data element within the data source, for that data element, and each runtime rule is mapped to a corresponding data definition of a sensitive data element based on the type of sensitive data; and receive the data and the data definitions, and for each data definition:

obtain the runtime rule mapped to that data definition; and apply the obtained runtime rule to the sensitive data element corresponding to that data definition in the received data and dynamically de-identify the sensitive data element for the target application by the ETL tool at runtime via the runtime de-identification protocol of the obtained runtime rule.

2. The computer program product of claim 1, wherein the computer readable program code is further configured to cause a hardware processor to:

consume the generated data definitions and apply the default de-identification protocol mapped to the sensitive data element data definition.

3. The computer program product of claim 2, wherein the computer readable program code is further configured to cause a hardware processor to:

compare the output of applying the default de-identification protocol with the output of applying the runtime de-identification protocol; and display the comparison for review.

4. The computer program product of claim 2, wherein the computer readable program code is further configured to cause a hardware processor to selectively re-identify the de-identified data element in accordance with rules to produce an unmasked data element.

5. The computer program product of claim 1, wherein the replacing further comprises:
overriding the generated default rule set with the runtime rule set, wherein the default rule set and the runtime rule set correspond to different target environments having different de-identification requirements.

6. The computer program product of claim 1, wherein the computer readable program code is further configured to cause a hardware processor to enable specification of the runtime rule set by designating a file location for the runtime rule set via the interface.

7. The computer program product of claim 1, wherein the computer readable program code is further configured to cause a hardware processor to enable specification of the runtime rule set via a text box provided on the interface.

8. A system for dynamically de-identifying sensitive data from a data source for a target application, the system comprising a computer system including at least one hardware processor configured to:
generate a default rule set including at least one rule, the default rule set including a default de-identification protocol to produce de-identified data from an Extract/Transform/Load (ETL) tool, wherein the default de-identification protocol is selected based on business rules;
map the default rule set to data definitions each generated by a discovery tool and associated with a corresponding sensitive data element identified in the data;
specify a runtime rule set comprising at least one runtime rule, the runtime rule including a runtime de-identification protocol to produce de-identified data from the ETL tool, wherein the runtime rule set is specified via an interface;
replace the default rule set with the runtime rule set to change the default de-identification protocol to the runtime de-identification protocol at runtime to accommodate changing de-identification requirements of a target environment, and map the runtime rule set to the data definitions, wherein
each data definition includes a data object comprising metadata, including an indicator of a type of sensitive data from among a plurality of types of sensitive data and information indicating the location of the data element within the data source, for that data element, and
each runtime rule is mapped to a corresponding data definition of a sensitive data element based on the type of sensitive data; and
receive the data and the data definitions, and for each data definition:
obtain the runtime rule mapped to that data definition; and
apply the obtained runtime rule to the sensitive data element corresponding to that data definition in the received data and dynamically de-identify the sensitive data element for the target application by the ETL tool at runtime via the runtime de-identification protocol of the obtained runtime rule.

9. The system of claim 8, wherein the at least one hardware processor is further configured to:
consume the generated data definitions and apply and apply the default de-identification protocol mapped to the sensitive data element data definition.

10. The system of claim 9, wherein the at least one hardware processor is further configured to:
compare the output of applying the default de-identification protocol with the output of applying the runtime de-identification protocol; and
display the comparison for review.

11. The system of claim 9, wherein the at least one hardware processor is further configured to selectively re-identify the de-identified data element in accordance with rules to produce an unmasked data element.

12. The system of claim 8, wherein the replacing further comprises:
overriding the generated default rule set with the runtime rule set, wherein the default rule set and the runtime rule set correspond to different target environments having different de-identification requirements.

13. The system of claim 8, wherein the at least one hardware processor is further configured to enable specification of the runtime rule set by designating a file location for the runtime rule set via the interface.

14. The system of claim 8, wherein the at least one hardware processor is further configured to enable specification of the runtime rule set via a text box provided on the interface.

15. The computer program product of claim 1, wherein each data definition is in the form of an Extensible Markup Language (XML) file.

16. The system of claim 8, wherein each data definition is in the form of an Extensible Markup Language (XML) file.

17. A system for dynamically de-identifying sensitive data from a data source for a target application, the system comprising a computer system including at least one hardware processor configured to:
identify sensitive data elements in the data via a discovery tool, wherein identifying a sensitive data element comprises associating the data element with a type of sensitive data from among a plurality of types of sensitive data;
generate data definitions via the discovery tool, wherein each data definition is associated with an identified sensitive data element and includes a data object comprising metadata, including an indicator of a type of sensitive data and information indicating the location of the data element within the data source, for that data element;
specify a default rule set comprising at least one runtime rule, the default rule set including a default de-identification protocol to produce de-identified data from an Extract/Transform/Load (ETL) tool, wherein the default de-identification protocol is selected based on business rules;
map the default rule set to the data definitions generated by the discovery tool for the identified sensitive data elements;
replace the default rule set with a runtime rule set comprising at least one runtime rule, the runtime rule including a runtime de-identification protocol to produce de-identified data from the ETL tool, wherein the runtime rule set is specified via an interface and the replacing changes the default de-identification protocol to the runtime de-identification protocol at runtime to accommodate changing de-identification requirements of a target environment;
map the runtime rule set to the data definitions generated by the discovery tool and associated with a corresponding sensitive data element identified in the data, wherein each runtime rule is mapped to a corresponding data definition of a sensitive data element based on the type of sensitive data; and receive the data and the data definitions, and for each data definition:
  obtain the runtime rule mapped to that data definition; and
  apply the obtained runtime rule to the sensitive data element corresponding to that data definition in the received data and dynamically de-identify the sensitive data element for the target application by the ETL tool at runtime via the runtime de-identification protocol of the obtained runtime rule.

* * * * *